United States Patent [19]

Sasaki et al.

[11] Patent Number: 4,558,266

[45] Date of Patent: Dec. 10, 1985

[54] WORKPIECE TRANSFER APPARATUS

[75] Inventors: Tamotsu Sasaki, Mishima; Yutaka Tsuchiya, Shizuoka, both of Japan

[73] Assignee: Toshiba Kikai Kabushiki Kaisha, Tokyo, Japan

[21] Appl. No.: 590,050

[22] Filed: Mar. 15, 1984

[30] Foreign Application Priority Data

Mar. 22, 1983 [JP] Japan .................... 58-45918

[51] Int. Cl.$^4$ ........................... G05B 19/25
[52] U.S. Cl. ........................ 318/571; 74/44; 74/835
[58] Field of Search ............ 318/571, 561; 74/44, 74/442, 830, 835; 414/552, 525

[56] References Cited

U.S. PATENT DOCUMENTS

| | | | |
|---|---|---|---|
| 3,893,616 | 7/1975 | Trousdale | 318/571 X |
| 3,918,348 | 11/1975 | Runft | 318/571 X |
| 3,952,238 | 4/1976 | Cutler | 318/571 |
| 4,150,327 | 4/1979 | Camera | 318/571 X |
| 4,322,669 | 3/1982 | Fukuma | 318/571 |
| 4,342,379 | 8/1982 | Games | 318/561 X |
| 4,473,786 | 9/1984 | Miyashita | 318/561 |

*Primary Examiner*—William M. Shoop, Jr.
*Assistant Examiner*—Patrick C. Keane
*Attorney, Agent, or Firm*—Stevens, Davis, Miller & Mosher

[57] ABSTRACT

A workpiece transfer bar is reciprocated by a rack driven by a pinion which is driven by a servomotor through an eccentric arm. A computer is used to set rates of acceleration and deceleration, a maximum speed, etc. in accordance with the origin of the transfer bar, stroke thereof etc.

5 Claims, 7 Drawing Figures

F I G. 4
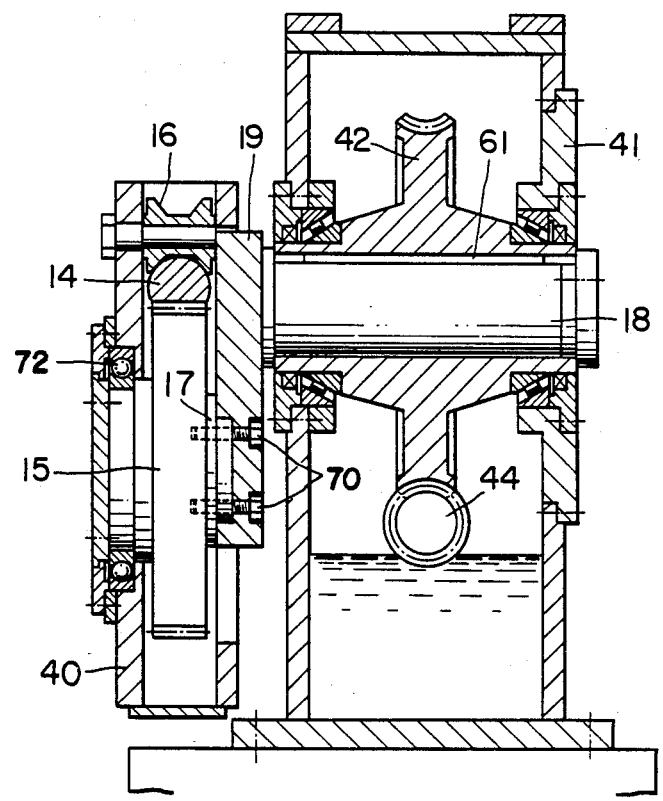

WORKPIECE TRANSFER APPARATUS

BACKGROUND OF THE INVENTION

This invention relates to a workpiece transfer apparatus, and more particularly to a workpiece transfer apparatus utilizing a servomotor as a source of drive.

A transfer apparatus utilized to transfer a plurality of workpieces disposed at a predetermined positions on a working or machining line or to transfer workpieces between not working stations is generally requested to have the following performances.

(a) a capability of correctly transferring the workpiece to a predetermined position (positioning performance)

(b) a capability of changing transfer pitch of the workpiece (transfer pitch changing performance)

(c) a capability of minimizing shocks at the time of start and stop and decreasing the transfer time (transfer speed control performance).

To realize these performances it has been the conventional practice to use electric motors having different speeds. With such method of driving, however, since the speed curve of the movement of a transfer bar is predetermined, it is impossible to obtain an optimum speed curve commensurate with the distance of movement and the weight of the workpiece, so that the transfer efficiency is poor and the transfer time cannot be reduced.

It has also been tried to use a special link mechanism so as to make smaller the speeds at the time of starting and stopping the transfer bar than that of during transfer for the purpose of minimizing the effect of the moment of inertia at the time of starting and stopping the transfer bar. Usually, however, since the speed curve resembles a sine curve or a curve similar thereto, the rate of deceleration immediately before stopping the transfer bar is high, so that it is impossible to correctly stop with small shock, only with the link mechanism. For this reason, it has been necessary to use a special braking mechanism for the transfer bar or the driving motor.

SUMMARY OF THE INVENTION

It is an object of this invention to provide a novel workpiece transfer apparatus capable of changing the transfer pitch to any desired value and continuously and smoothly changing the transfer speed.

According to this invention, there is provided a workpiece transfer apparatus comprising a reciprocating transfer bar for transferring a workpiece; a swinging lever connected to the transfer bar for reciprocating the same; a rack connected to the swinging lever; a pinion meshing with the rack; an eccentric arm driven by a servomotor for driving the pinion; means for measuring the stroke of the transfer bar for producing stroke data; means for detecting the origin of the transfer bar; and a computer including means for setting a maximum speed of the servomotor in accordance with the weight of the workpiece and the stroke data; means for setting rates of acceleration and deceleration of the servomotor in accordance with the maximum speed; and means for supplying a start signal to the servomotor in accordance with an origin confirmation signal produced by the origin detecting means.

BRIEF DESCRIPTION OF THE DRAWINGS

In the accompanying drawings:

FIG. 4 is a sectional view taken along a line IV—IV in FIG. 3;

DESCRIPTION OF THE PREFERRED EMBODIMENT

Figure 1:
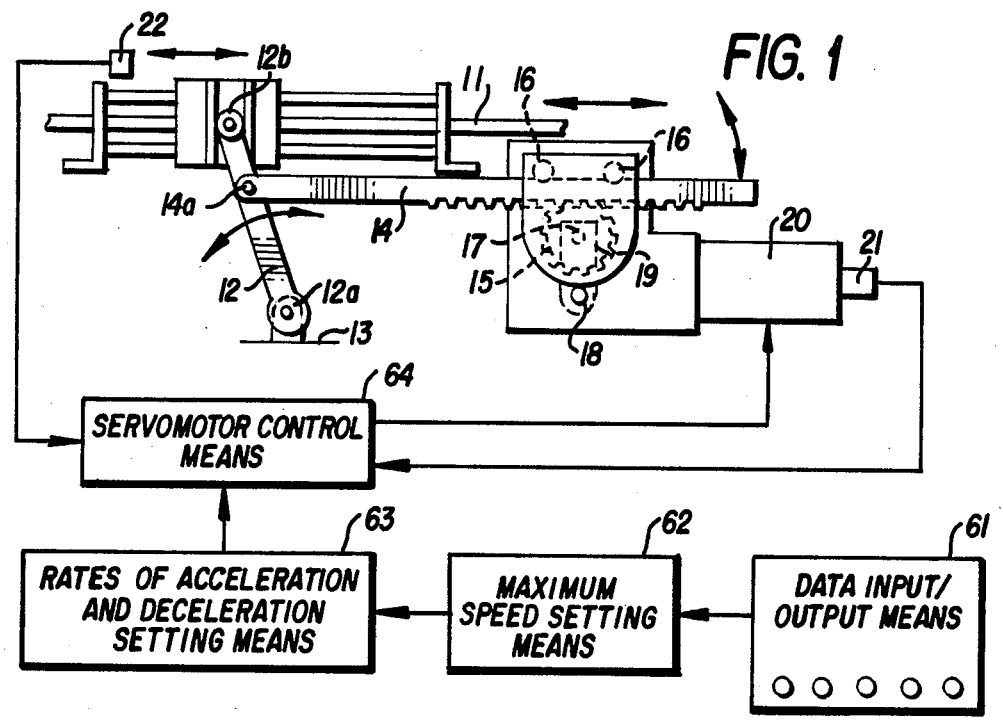
FIG. 1 is a general view, partly in block form, showing one embodiment of the workpiece transfer apparatus embodying the invention.
Figure 6:
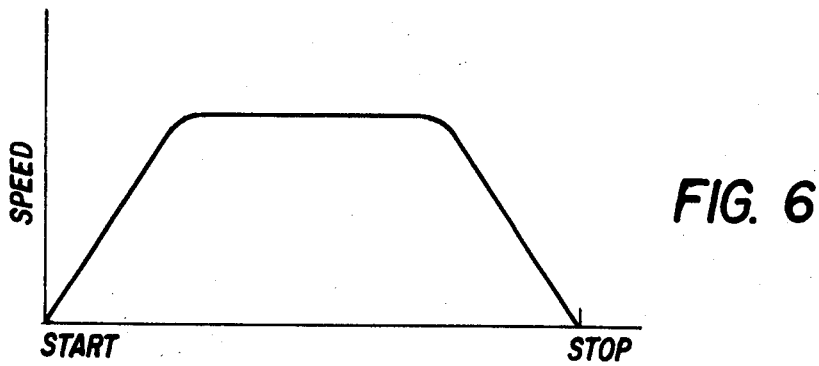
FIG. 6 shows a speed characteristic of the servomotor.

A preferred embodiment of the workpiece transfer apparatus shown in FIGS. 1-4 comprises a transfer bar 11 reciprocatable in the horizontal direction, a swinging lever 12 with one end 12a pivotally supported by a stationary member 13 and the other end 12b pivotally connected to the transfer bar 11, a rack 14 with one end 14a pivotally connected to the swinging lever 12, a pinion 15 meshing with rack 14, guide rollers 16 for urging the rack 14 against pinion 15, an eccentric arm 19 supporting the pinion 15 at one end and driven by a drive shaft 18 at the other end, a servomotor 20 for driving the drive shaft 18, a measuring device 21 for measuring the distance of travel of the transfer bar 11, and an origin detector 22 detecting the origin of the transfer bar 11. More particularly, the servomotor 20 drives the drive shaft 18 through through a worm 44, and a worm wheel 42 secured to the drive shaft 18 through a key 71. The eccentric arm 19 is secured to one end of the drive shaft 18 and secured to the pinion 15 through bolts 70. One end of shaft 17 of the pinion 15 is journaled by a bearing 72 in a casing 40.

The electric circuit comprises data input/output means 61 which is inputted with an instruct weight data of the workpiece transferred by the transfer bar 11, as well as data representing the stroke of the transfer bar, maximum speed setting means 62 for setting the maximum speed of servomotor 20 in accordance with a weight instruction and a stroke instruction issued from the data input/output means 61, rates of acceleration and deceleration setting means 63 for setting the rates of acceleration and deceleration of the servomotor 20 in accordance with the maximum speed set by the maximum speed setting means 62 and servomotor control means 64 which issues a start signal to the servomotor 20 in response to an origin signal from the origin detector 22, issues an acceleration termination signal to servomotor 20 in accordance with the rates of acceleration and deceleration set by the setting means 23 and issues a deceleration start signal and stop signal to the servomotor in accordance with the stroke measured by the transfer bar stroke measuring device 21.

The weight data and the transfer bar stroke data inputted to the data input/output means 61 are processed with a prestored program to set the maximum speed and rate of acceleration and deceleration of the servomotor. In accordance with these set values and the origin signal from the origin detector 22, the servomotor 20 is started and accelerated to run at the set maximum speed. Then the servomotor 20 moves the left end 14a of rack 14 along a cycloid curve through eccentric arm 19 and pinion 15. Consequently the lever 12 is swung to reciprocate the transfer bar 11. The stroke thereof is measured by the travel measuring device 21 so that when the transfer bar is moved over a predetermined stroke, the servomotor 20 is decelerated to stop.

Figure 2:
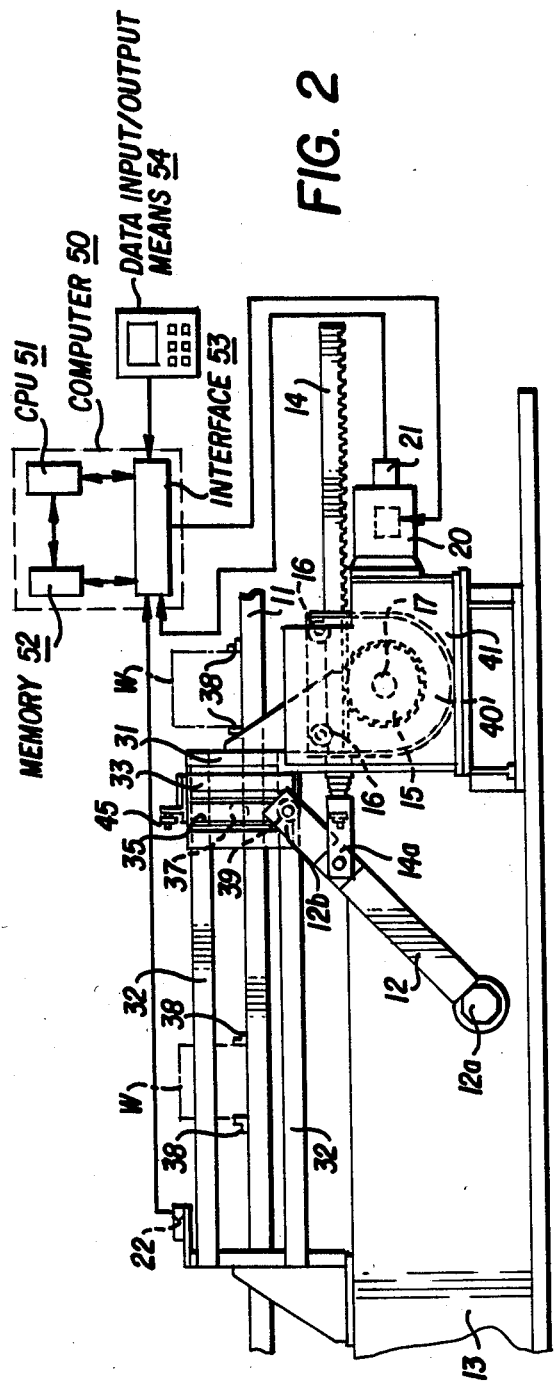
FIG. 2 is an enlarged side view of important portions of the embodiment shown in FIG. 1.
Figure 3:
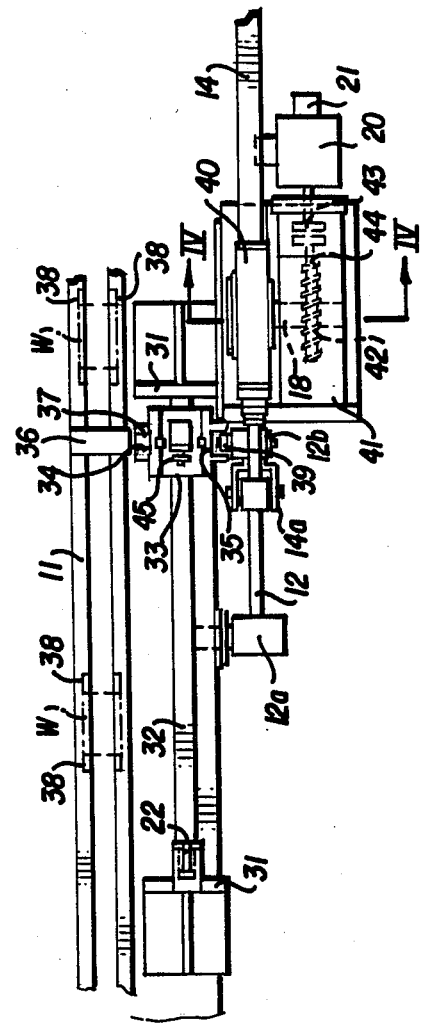
FIG. 3 is an upper view of the embodiment shown in FIGS. 1 and 2.

The detail of the construction and operation of the embodiment will be described with reference to FIGS. 2 through 7. As shown in FIG. 2 and FIG. 3, two spaced stationary brackets 31 are secured on the upper surface of the machine bed 13 for holding in parallel a pair of guide bars 32 which slidably support a saddle 33. Both side surfaces thereof are provided with guide grooves 34 and 35 extending at right angles. One of the guide grooves 34 slidably receives a roller 37 pivotally mounted on one end of bracket 36 with its bottom surface secured to the upper surface of the transfer bar 11. Claws 38 for holding a workpiece are provided on the upper surface of the transfer bar 11 at a predetermined spacing. The other guide groove 35 of the saddle 33 slidably receives a roller 39 pivotally mounted on the upper end 12b of the swinging lever 12. The lower end 12a of the swinging lever 12 is pivotally connected to the base 13 so that the swinging lever 12 can swing along guide bars 32. The fore end 14a of the rack 14 is pivotally connected to an intermediate point of the swinging lever 12. The rack 14 meshes with the pinion 15 with one end rotatably supported in a swinging casing 40. Two guide rollers 16 rotatably supported by the swinging casing 40 urge the rack 14 against the pinion 15. One end of the eccentric arm 19 is fitted on the shaft 17 of the pinion 15. The other end of the eccentric arm 19 is connected to the drive shaft 18, the opposite ends thereof being rotatably supported by a reduction gear casing 41 secured to the base 13. The drive shaft 18 is provided with a worm wheel 42 driven by the servomotor, for example an induction motor 20, via coupling 43. A pulse encoder 21 is connected to the shaft of the servomotor 20 for deriving out present position and speed data of the servomotor as digital signals.

A limit switch 22 for detecting the origin of the transfer bar 11 is secured to one of the stationary brackets 31 that hold the guide bars 32. The limit switch 22 is actuated by a dog 45 mounted on the saddle 33.

The operation of the servomotor 20 is controlled by a computer 50, for example a microcomputer. The computer 50 comprises a central processing unit (CPU) 51, a memory device 52 and an interface 53 (input/ output signal processing circuit). The memory device 52 is used to store a running program regarding the maximum speed, and rates of acceleration and deceleration of the servomotor 20 which are set in accordance with the weight data and the transfer bar stroke data designated by data input/output means 54. The CPU 51 executes arithmetic operations based on the weight data and the transfer bar stroke data for setting the maximum speed as well as the rates of acceleration and deceleration of the servomotor 20. In addition, the CPU 52 issues a start signal, and an acceleration signal to the servomotor 20 based on an origin confirmation signal from limit switch 22. Furthermore, the CPU 52 calculates a feedback signal from the pulse encoder 21 based on the running program stored in memory device 51, and issues an acceleration termination signal, a deceleration starting signal and a stop signal to the servomotor 20. Inputting of signals from pulse encoder 21, and a limit switch 22 to the data input/output means 54 and outputting of a control signal to the servomotor 20 are made through interface 53.

The embodiment described above operates as follows.

Before starting the operation of the transfer device, by operating a key of the data input/output means 54, the weight data and the transfer bar stroke data are inputted into CPU 52, which processes these data in accordance with predetermined evaluation functions (for example, functions for minimizing the transfer time and power consumption, or for decreasing shocks at the time of starting and stopping), thereby setting the maximum speed and rates of acceleration and deceleration. These set data are stored in the memory device 51 for preparing the running program of the transfer device. Then a start button is depressed and the origin confirmation signal of the transfer bar 11 issued from the limit switch 22 is inputted to the computer 50. Then after confirming this signal, the CPU issues a start signal to the servomotor 20. In the absence of the origin confirmation signal, the transfer bar 11 is moved manually to a predetermined waiting position. Once the servomotor 20 is started, it is accelerated and when its speed reaches the maximum speed the acceleration is stopped according to the running program. The speed of the servomotor is controlled by a well known pulse width modulation system. Meanwhile, the pulse encoder 21 inputs into the CPU the present position data and the speed data as feedback signals, thereby confirming the stroke of the transfer bar 11 and the number of revolutions of the servomotor 20. When the fact that the transfer bar 11 has been moved to the deceleration start position is confirmed, a deceleration start signal is issued to the servomotor 20 so as to cause it to continuously decelerate at a predetermined rate. When the fact that the transfer bar 11 has reached a stroke end is confirmed, a stop signal is issued to the servomotor 20 to stop the same.

Figure 5:
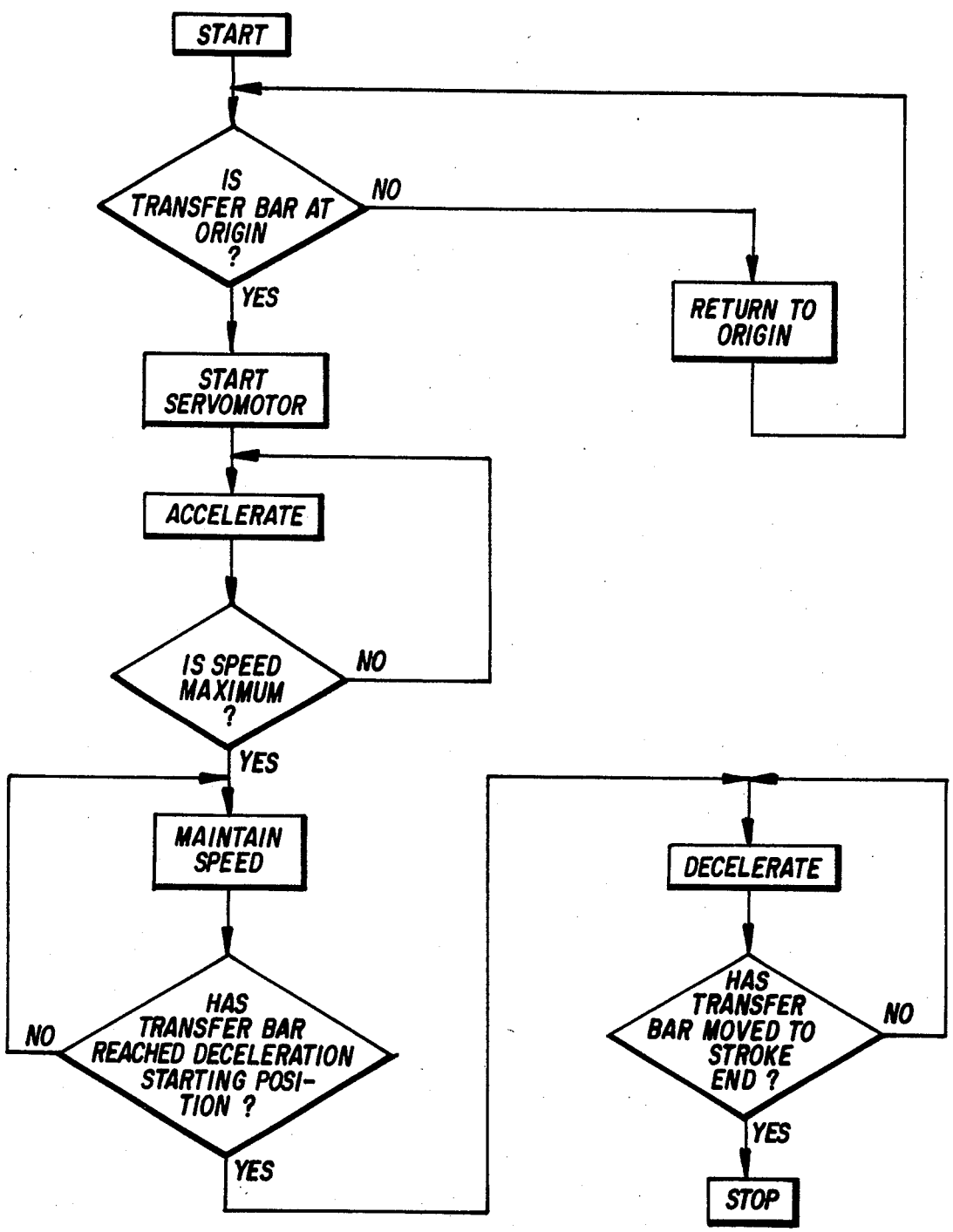
FIG. 5 is a flow chart showing a program of controlling a servomotor.

FIG. 5 is a flow chart showing various steps of the control described above of the servomotor, and FIG. 6 shows a speed characteristic obtained by the control.

When the transfer bar is to be retracted, a reverse rotation instruction signal is transmitted to the servomotor 20. Although the servomotor 20 accelerates, maintains the maximum speed, decelerates and stops in the same manner as above described, since at this time no workpiece is transferred, it is necessary to change the maximum speed and the rates of acceleration and deceleration to suitable values. Furthermore, it is necessary to change the return pitch for transferring a workpiece which is positioned at a no working position, where measurement of the dimensions of a machined workpiece and blow off of cutting chips are made. Change of the return pitch can readily be made by controlling the number of pulses applied to the servomotor 20.

The torque of the servomotor 20 is converted into the longitudinal movement of the transfer bar 11 by the following mechanism. More particularly, the torque of the servomotor 20 is transmitted to drive shaft 18 via worm 44 and worm wheel 42 for rotating the eccentric arm 19 about the axis of the drive shaft 18. Rotation of the eccentric arm 19 swings the pinion 15 about the axis of drive shaft 18 so as to cause the pinion to mesh with the rack 14, thus moving the same in the longitudinal direction. By the pressure applied by guide rollers 16, the rack 14 is swung together with pinion 15. The rack 14 is moved such that its left end 14a is moved along a cycloid curve. Movement of the rack 14 causes the swinging lever 12 to swing about the center of the lower end 12a so as to push roller 39 received in guide groove 35, thereby causing the saddle to slide along guide bars 32. As the saddle 33 is moved, roller 37 received in guide groove 34 is pushed to move bracket 36 together with saddle 33. As a consequence, guide bar 11 connected to bracket 36 is moved over a predetermined distance in the same direction as saddle 33. The returning motion of the guide bar 11 is effected by an operation opposite to that described above.

Figure 7:
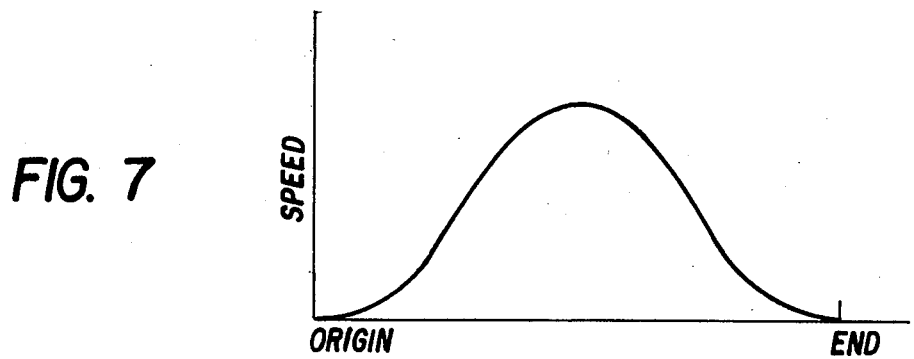
FIG. 7 shows a speed characteristic of a transfer bar.

FIG. 7 shows a speed curve of the guide bar 11 moved in a manner described above. As shown, the guide bar 11 is smoothly accelerated and decelerated at the starting point and end point whereas at an intermediate region the guide bar 11 is moved at the highest speed. For this reason, the effect of moment of inertia at the times of start and stop can be greatly reduced, thus preventing shocks. Moreover, since the speed is continuously varied, the time required for conveying a workpiece can be reduced. Besides an induction motor, an AC servomotor, a DC servomotor, an oil pressure pulse motor, etc. can also be used as the servomotor. It is also possible to use a magnetic scale, Indutsyne (Trade Mark) for measuring the stroke of the transfer bar. To detect the origin of the transfer bar, a photosensor can be substituted for the limit switch.

As above described, according to this invention, the servomotor can be operated at an optimum rate of acceleration and deceleration in accordance with the weight of a workpiece being transferred and transfer pitch, so that it is possible not only to decrease the transfer time but also increase the transfer efficiency. Moreover, since the transfer bar is moved by mechanical means along a cycloid curve, shocks at the time of starting and stopping can be more efficiently reduced. Also control of the stroke and variation of the transfer pitch can readily be made by controlling the number of pulses supplied to the servomotor. Furthermore, as the stroke measuring signal is fed back by the stroke measuring device it is possible to correctly control the transfer pitch and the transfer speed. Further, as the position control system utilizes a position confirming signal produced by the origin detector, positioning can be made with high accuracy.

Thus, the invention provides an improved workpiece transfer apparatus having excellent positioning, transfer pitch changing and transfer speed controlling performances by utilizing a servomotor whose speed can be controlled as desired.

We claim:
1. Workpiece transfer apparatus comprising:
 a reciprocating transfer bar for transferring a workpiece;
 a swinging lever connected to said transfer bar for reciprocating the same;
 a rack connected to said swinging lever;
 a pinion meshing with said rack;
 an eccentric arm driven by a servomotor for driving said pinion;
 means for measuring a stroke of said transfer bar for producing stroke data;
 means for detecting an origin of said transfer bar; and
 a computer including:
 means for setting a maximum speed of said servomotor in accordance with a weight of said workpiece and said stroke data;
 means for setting rates of acceleration and deceleration of said servomotor in accordance with said maximum speed; and
 means for supplying a start signal to said servomotor in accordance with an origin confirmation signal produced by said origin detecting means.

2. The workpiece transfer apparatus according to claim 1 wherein said computer further comprises means for applying an acceleration termination signal to said servomotor in accordance with said rate of acceleration, and means for applying to said servomotor a deceleration start signal and a stop signal in accordance with said rate of deceleration and said stroke data.

3. The workpiece transfer apparatus according to claim 1 wherein said stroke measuring means comprises a pulse encoder driven by said servomotor.

4. The workpiece transfer apparatus according to claim 1 wherein said origin detecting means comprises a limit switch actuated when said transfer bar reaches said origin.

5. The workpiece transfer apparatus according to claim 1 which further comprises means for urging said rack to engage said pinion.

* * * * *